(No Model.)

J. B. MUELLER.
HARNESS PAD.

No. 550,005.  Patented Nov. 19, 1895.

Witnesses

John B. Mueller
_Inventor_

UNITED STATES PATENT OFFICE.

JOHN B. MUELLER, OF STREATOR, ILLINOIS.

HARNESS-PAD.

SPECIFICATION forming part of Letters Patent No. 550,005, dated November 19, 1895.

Application filed February 28, 1895. Serial No. 539,970. (No model.)

*To all whom it may concern:*

Be it known that I, JOHN B. MUELLER, a citizen of the United States, residing at Streator, in the county of La Salle and State of Illinois, have invented certain new and useful Improvements in Collar-Pads; and I do hereby declare the following to be a full, clear, and exact description of the invention, such as will enable others skilled in the art to which it appertains to make and use the same.

My invention relates to improvements in collar-pads—that is to say, a pad to be placed under the usual collar and rest upon the neck of the animal; and one object of my invention is the provision of a collar-pad which will rest comfortably, snugly, and smoothly upon the neck of the animal and will be proof against chafing or bruising the neck of the animal.

Another object is the provision of a collar-pad which will have lateral and longitudinal swing or movement, the purpose being to remove the pull or strain from the collar and enable the animal to draw the vehicle without undue fatigue or fear of rubbing the skin.

Another object is the provision of a collar-pad which will be simple, inexpensive, and practical in construction and possess the features of merit to commend it as a thoroughly useful and efficient improvement.

To attain the desired objects, the invention consists of a collar-pad embodying novel features of construction and combination of parts, substantially as disclosed herein.

Figure 1:
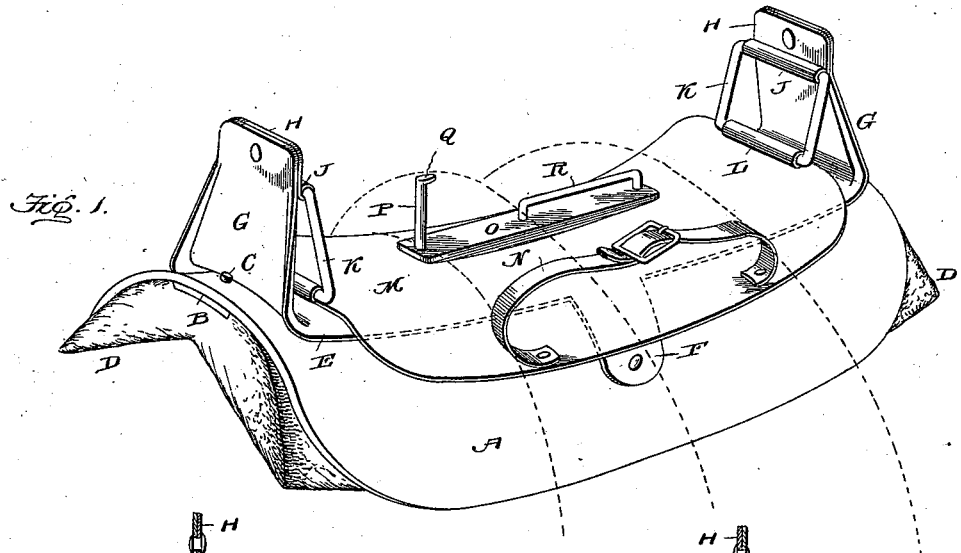
Figure 2:
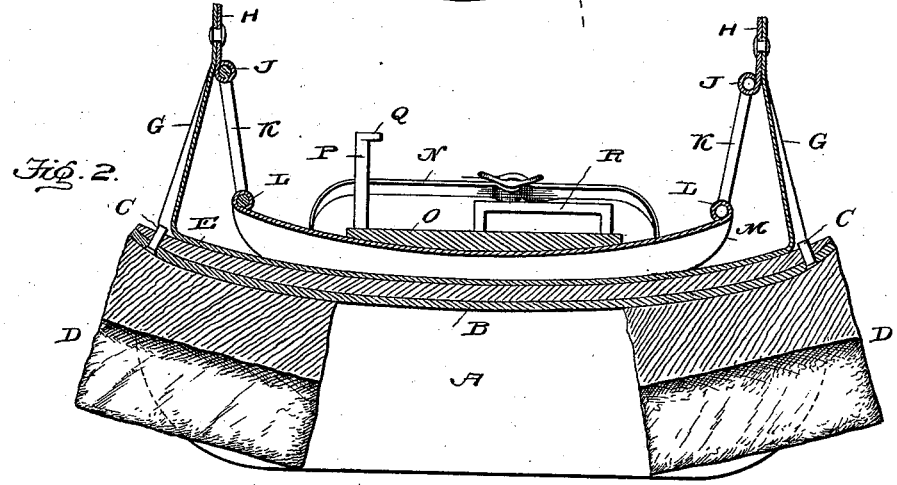
Figure 3:
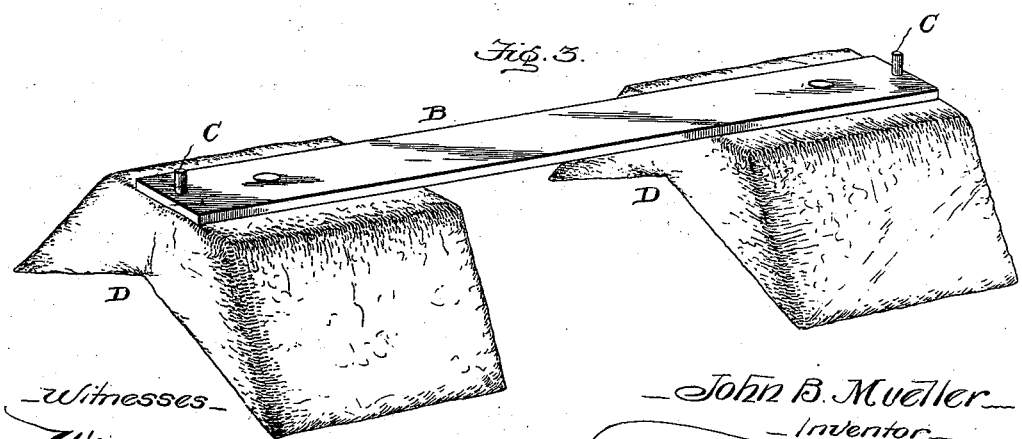

Figure 1 represents a perspective view of my collar-pad complete. Fig. 2 represents a central longitudinal sectional view thereof, and Fig. 3 represents a perspective view of the sore-neck attachment detached from the pad proper.

In the drawings, A designates the base or foundation of the pad, which is bent to the shape of the neck of the animal, and is preferably made of sole-leather.

Where the pad is used upon the neck of an animal having a chafed or sore portion, the healing-pad is used, which consists of the strap B, having at each end an upward-projecting rivet C, secured to the pad and having at each end the adjustable pads or cushions D, made of felt, cloth, fur, or in fact any soft material, which is made of the proper shape to fit the pad and the neck of the beast. It is evident that this pad makes my invention specially useful and desirable for animals having a chafed or sore neck and that in time a healing is assured.

To the upper side of the pad is fitted the plate E, having ears F secured rigidly to the pad, and at each end rise the lugs or uprights G, to the inner face of which are pivoted the plates H, having sleeves J and having a lateral loose or swinging movement. Fitting in said sleeves J is the upper bar of the links K, the lower ends whereof are fitted in the sleeves L of the curved plate M, which carries the collar adjustable holding-straps N and plate O, having the pin P, provided with hook Q and the loop R, said loop and pin serving to hold the collar reliably on the swinging plate, the pin engaging the edge and the loop the strap of the collar.

It is evident that my collar-pad will heal the sore on an animal; also that it will insure ease and comfort and materially reduce the draft, and possesses all the advantages to commend it as useful and desirable.

I claim—

1. In combination with the base, the plate rigidly connected thereto on its upper face and conforming to the shape of the base or pad, laterally movable ears carried by the base, links swingingly connected to the ears, a plate connected to said links, and the adjustable holding straps on said plate.

2. The combination of the pad proper, the plate fitting the upper face of said pad and secured thereto, the plate having a free or universal swinging movement on said plate, the adjustable straps carried by the rigid plate and the hook and loop carried by the swinging plate.

3. A collar pad consisting of the pad of proper shape to fit the neck of the animal, the base plate secured to the pad and having the vertical lugs or uprights at each end, the links loosely connected to said lugs and the plate connected to the links and carrying the collar straps.

4. A collar pad, consisting of the pad proper, the plate fitting snugly on the pad and having the ears secured to the pad and having the end lugs or uprights, the links connected to said uprights and having a free movement thereon, the plate loosely connected to the lower ends of said links, the adjustable straps carried by the plate and the hook and loop also carried by the said plate.

5. A collar pad, consisting of the pad proper, the strap secured to the under face of pad, the cushions carried by said strap, the plate secured to the pad and having the end lugs, the links connected to said lugs and the plate connected to the links and carrying the adjustable collar strap.

In testimony whereof I affix my signature in presence of two witnesses.

JOHN B. MUELLER.

Witnesses:
  B. A. HATTENHAUER,
  WM. REIFERSCHIED.